(12) United States Patent
Knopf

(10) Patent No.: US 7,692,802 B2
(45) Date of Patent: Apr. 6, 2010

(54) IMAGE SETTING DEVICE, MODULE AND PRINTING PRESS FOR RELATIVE MOTION COMPENSATION OF IMAGE SETTING DEVICE AND PRINTING FORM

(75) Inventor: Eric Knopf, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1475 days.

(21) Appl. No.: 10/295,686

(22) Filed: Nov. 15, 2002

(65) Prior Publication Data

US 2003/0090731 A1 May 15, 2003

Related U.S. Application Data

(60) Provisional application No. 60/339,180, filed on Dec. 11, 2001.

(30) Foreign Application Priority Data

Nov. 15, 2001 (DE) ................................ 101 56 207

(51) Int. Cl.
*G06F 3/12* (2006.01)
*G06F 15/00* (2006.01)
*H04N 1/40* (2006.01)

(52) U.S. Cl. .......................... 358/1.1; 358/1.7; 358/3.29

(58) Field of Classification Search ................ 347/248, 347/12, 234; 358/3.26, 3.32, 1.12, 1.1, 1.9, 358/1.11–1.18, 1.7, 1.8, 3.29; 101/467, 463.1, 101/478

See application file for complete search history.

(56) References Cited

U.S. PATENT DOCUMENTS 4,050,075 A * 9/1977 Hertz et al. ................... 347/73

| | | | |
|---|---|---|---|
| 5,369,348 A | | 11/1994 | Gennessaux |
| 5,481,152 A | * | 1/1996 | Buschulte ................... 310/328 |
| 5,729,277 A | * | 3/1998 | Morrison ..................... 347/248 |
| 5,947,020 A | | 9/1999 | Bornhorst, Jr. et al. |
| 6,101,944 A | * | 8/2000 | Schmid et al. ............... 101/467 |
| 6,355,926 B1 | * | 3/2002 | Hubble et al. ............ 250/214 R |
| 6,426,765 B1 | * | 7/2002 | Iwasaki et al. ................. 347/12 |
| 6,522,422 B1 | * | 2/2003 | Klingler et al. ............. 358/1.15 |
| 6,561,607 B1 | * | 5/2003 | Lubinsky et al. ............... 347/8 |
| 6,662,720 B1 | | 12/2003 | Schmid |

FOREIGN PATENT DOCUMENTS

| | | |
|---|---|---|
| DE | 692 12 073 T2 | 12/1992 |
| DE | 44 20 110 C2 | 2/1996 |
| DE | 197 19 635 C1 | 11/1998 |
| DE | 198 48 455 A1 | 4/2000 |
| JP | 2000127331 A | 5/2000 |

* cited by examiner

*Primary Examiner*—Thierry L Pham
(74) *Attorney, Agent, or Firm*—Laurence A. Greenberg; Werner H. Stemer; Ralph E. Locher

(57) ABSTRACT

An imaging device for setting an image on a printing form by at least one imaging energy source, includes a device for determining a component of a relative movement between the imaging energy source and the printing form whereon an image is to be set. An actuator device moves the imaging energy source in such a manner that undesired components of the relative movement between the imaging energy source and the printing form are reduced. An imaging module may be formed of at least two of the imaging devices. A printing press includes the imaging device or the imaging module. A method sets an image on a printing form.

10 Claims, 1 Drawing Sheet

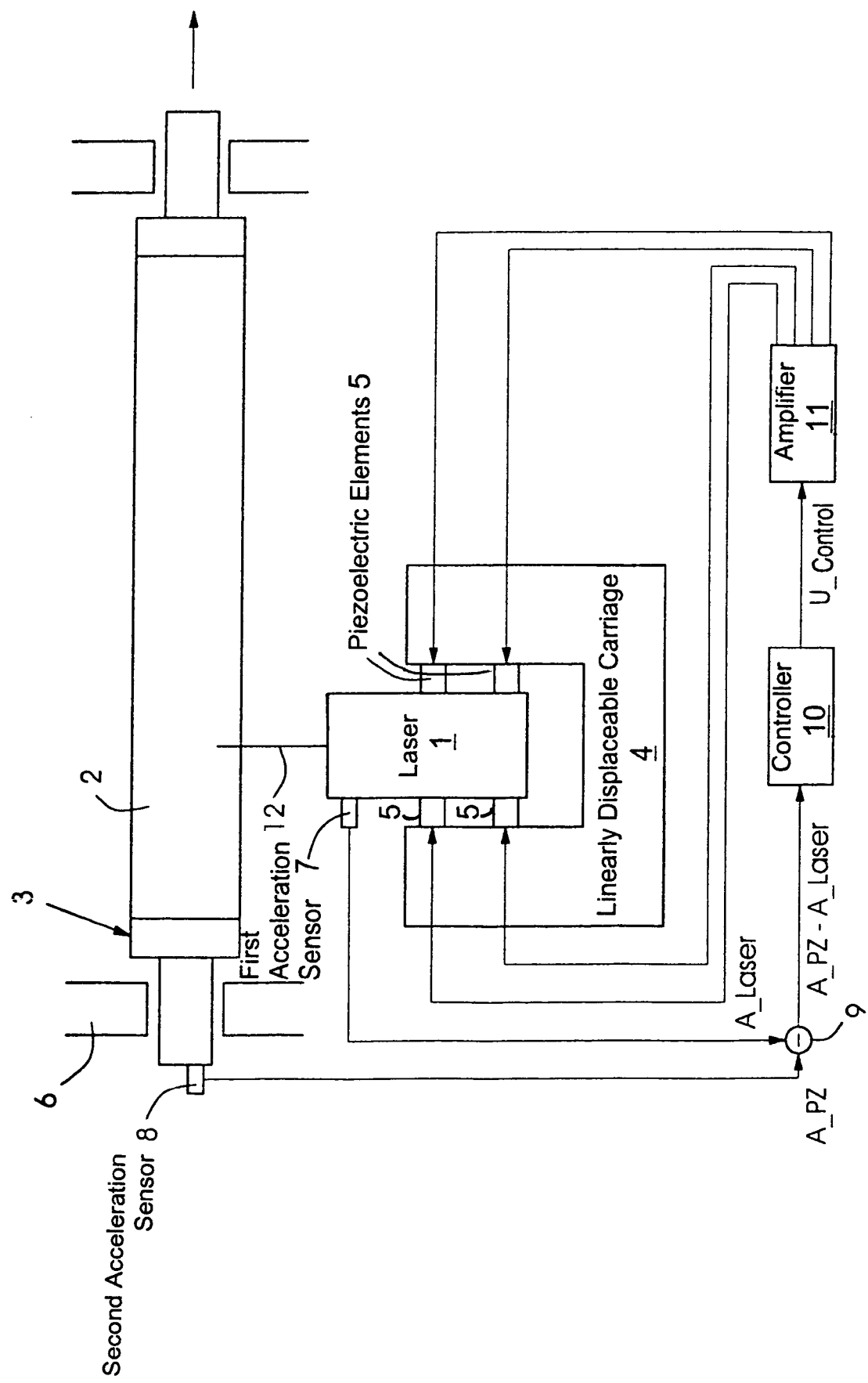

IMAGE SETTING DEVICE, MODULE AND PRINTING PRESS FOR RELATIVE MOTION COMPENSATION OF IMAGE SETTING DEVICE AND PRINTING FORM

CROSS-REFERENCE TO RELATED APPLICATION

This application claims the benefit under 35 U.S.C. §119 (e) of provisional application No. 60/339,180, filed Dec. 11, 2001.

BACKGROUND OF THE INVENTION

Field of the Invention

The invention relates to an imaging device, an imaging module and a printing press having the imaging device and a method for setting images on printing forms.

When setting an image on a printing form which, for example, is clamped onto a cylinder, the desired information can be transferred to the printing form with the aid of an imaging energy source. Imaging energy sources generally include light sources in the visible and/or invisible frequency range, spark discharges, thermal energy sources, laser light sources and the like. The entire area of the printing form whereon an image is to be set is scanned successively with the imaging energy source. In that regard, the information is transferred to the printing form in accordance with an original in the form of individual pixels or halftone dots, or groups thereof. In particular, if the imaging device is integrated into a printing press, the imaging operation can be impaired by interference or disruptive effects which act upon the imaging energy source and/or the printing form. The interference can occur, for example, in the form of mechanical oscillations. If the pixels or halftone dots are to be produced as exactly as possible at desired positions on the printing form and sharply focussed, measures usually should be taken to reduce the effect of interference or disruption upon the imaging energy source and/or the printing form.

The effect of interference can be reduced, for example, by attenuation measures. For example, German Patent DE 197 19 635 C1 discloses a printing press having a device for attenuating oscillations when setting an image on a form cylinder. The form cylinder and the imaging device are mounted jointly in an absorber in the side wall of the printing press especially in order to be able to suppress high-frequency oscillations during the image-setting or imaging operation. As an alternative thereto, the form cylinder and the imaging device, respectively, can also be mounted in respective absorbers, exclusive to each thereof, in the side wall of the printing press.

As a rule, the effect of the interference can only be reduced with tolerable expense to a specific extent by providing attenuation or damping. Complete compensation is usually impossible or requires very great outlay or effort. In addition, attenuation measures are adequately effective only for a limited spectrum of interference, and presuppose knowledge of the type of interference.

It is generally necessary to position the imaging energy source at a precisely defined distance from the surface of the printing form and to maintain that distance, for precise imaging of the printing form. In that regard, German Published, Non-prosecuted Patent Application DE 198 48 455 A1 discloses a printing form cylinder which is pivoted in such a manner that a prescribable distance, for example, to an imaging head, is maintained. For that purpose, the then present actual value for the distance is compared with a stored set-point or nominal value. If the actual value deviates impermissibly from the set-point or nominal value, the printing form cylinder is then pivoted with the aid of a linear drive in order to compensate for the deviation. As a result, for example, it is possible to compensate for shape deviations or circularity errors of the printing form cylinder.

SUMMARY OF THE INVENTION

It is accordingly an object of the invention to provide an imaging device, an imaging module and a printing press having the imaging device, as well as a method for setting images, which overcome the hereinafore-mentioned disadvantages of the heretofore-known devices and methods of this general type and which permit the most precise image-setting or imaging of a printing form irrespective of any interference that may be present.

With the foregoing and other objects in view, there is provided, in accordance with the invention, an imaging device for setting an image on a printing form by at least one imaging energy source. The device comprises a device for determining a component of a relative movement between the imaging energy source and the printing form whereon an image is to be set. An actuator device is provided for moving the imaging energy source in such a manner that undesired components of the relative movement between the imaging energy source and the printing form are reduced.

In accordance with another feature of the invention, the imaging device further includes a first sensor device for determining a component of a movement of the imaging energy source. A second sensor device determines a component of a movement of the printing form.

In accordance with a further feature of the invention, the imaging device further includes a linking device for determining the component of the relative movement between the imaging energy source and the printing form from the components of the movements determined by the respective first and second sensor devices.

In accordance with an added feature of the invention, the imaging device further includes a controller for generating a signal providing a basis for driving the actuator device, based upon the component of the relative movement between the imaging energy source and the printing form.

In accordance with an additional feature of the invention, the first and second sensor devices are acceleration sensors.

In accordance with yet another feature of the invention, the actuator device includes at least one piezoelectric element.

With the objects of the invention in view, there is also provided an imaging module, comprising at least two respective imaging devices for setting an image on a printing form by at least one imaging energy source. Each imaging device comprises a device for determining a component of a relative movement between the imaging energy source and the printing form whereon an image is to be set. An actuator device is provided for moving the imaging energy source in such a manner that undesired components of the relative movement between the imaging energy source and the printing form are reduced.

With the objects of the invention in view, there is additionally provided a printing press, comprising an imaging device for setting an image on a printing form by at least one imaging energy source. The imaging device includes a device for determining a component of a relative movement between the imaging energy source and the printing form whereon an image is to be set. An actuator device is provided for moving the imaging energy source in such a manner that undesired components of the relative movement between the imaging energy source and the printing form are reduced.

With the objects of the invention in view, there is furthermore provided a printing press, comprising an imaging module having at least two respective imaging devices for setting an image on a printing form by at least one imaging energy source. Each imaging device includes a device for determining a component of a relative movement between the imaging energy source and the printing form whereon an image is to be set. An actuator device is provided for moving the imaging energy source in such a manner that undesired components of the relative movement between the imaging energy source and the printing form are reduced.

With the objects of the invention in view, there is also provided a method of setting an image on a printing form, which comprises transferring imaging information by an imaging energy source to a printing form whereon an image is to be set. A component of a relative movement between the imaging energy source and the printing form is determined. The imaging energy source is moved in such a manner that undesired components of the relative movement between the imaging energy source and the printing form are reduced.

In accordance with a concomitant mode, the method of the invention further includes determining a difference between accelerations of the imaging energy source and the printing form. The imaging energy source is moved in such a manner that the difference between the accelerations is reduced.

Thus, the imaging device according to the invention for setting images on printing forms, using at least one imaging energy source, has a device for determining a component of the relative movement between the imaging energy source and the printing form whereon an image is to be set. Furthermore, the imaging device according to the invention has an actuator device with which the imaging energy source can be moved in such a manner that undesired components of the relative movement between the imaging energy source and the printing form are reduced.

The active suppression of interference with the aid of the actuator device offers the advantage of permitting a very large spectrum of interference to be compensated for, with comparatively little expenditure for equipment construction. In this regard, it is additionally possible to virtually completely suppress the effects of the interference on the imaging process. That is because, as opposed to conventional systems, the interference is not attenuated but actively compensated for. A further advantage is that, with the imaging device according to the invention, it is possible both to suppress interference which acts upon the printing form and interference which acts upon the imaging energy source. Since the interference is compensated for only to the extent that it acts differently on the printing form and on the imaging energy source, the imaging devices according to the invention operate very efficiently with regard to suppressing interference. Furthermore, the imaging device according to the invention offers the advantage that the interference does not have to be known in detail in advance, and that the full functional capability of interference suppression is generally still provided even when subsequent changes are made to the imaging device.

The imaging device according to the invention can have a first sensor device for determining a component of the movement of the imaging energy source and a second sensor device for determining a component of the movement of the printing form. Suitable sensor devices can be optical sensors, Hall magnetic field sensors, induction sensors or the like. Furthermore, the imaging device according to the invention can have a linking device for determining the component of the relative movement between the imaging energy source and the printing form from the movement components determined by the first and second sensor devices. This permits a quick and reliable determination of the component of the relative movement.

In the imaging device according to the invention, a controller can be provided which, based upon the component of the relative movement between the imaging energy source and the printing form, generates a signal that provides the basis for driving the actuator device.

The first and second sensor devices can expediently be constructed as acceleration sensors. This offers the advantage that the low-frequency travel movement can be eliminated in accordance with measurement technology by a suitable sensor selection. The acceleration sensors register only the oscillations caused by the interference. Expressed in another way, acceleration sensors offer the advantage that only the dynamics of the interference are registered. Precise compensation, virtually without any time delay, is therefore possible.

The actuator device can have at least one piezoelectric element. The movements of the imaging energy source required for compensating for the interference can be produced extremely quickly and precisely by using piezoelectric elements. Since the piezoelectric elements, in contrast with many other actuator devices, are not subjected to mechanical play, precision can be ensured permanently and, in particular, even during a reversal of movement.

In a preferred embodiment of the imaging device according to the invention, the imaging energy source is a light source, in particular a laser light source. The light source is controllable in terms of time duration and/or intensity. An imaging device can also have a number of light sources, disposed at least approximately in a line or in a two-dimensional grid. The light sources are controllable either independently of one another in terms of time duration and/or intensity, or individually.

Two imaging devices according to the invention or a greater number of imaging devices according to the invention can be combined to form an imaging module. In such an imaging module, a first part of the printing form surface is exposed by a first imaging device, and a second part of the printing form surface is exposed by a second imaging device. In an advantageous development of the imaging module, the imaging devices combined in the imaging module are movable relative to one another by a suitable actuator device, for example by a spindle drive or by a linear drive.

The imaging device according to the invention or the imaging module according to the invention are conceivable both as a self-contained unit or as being integrated into a printing unit or into a printing press. The printing press is preferably a direct or indirect planographic printing press or relief printing press, whether sheet-processing or web-processing, in particular an offset printing press. Due to the universally acting compensation for interference, the respective imaging device and the imaging module are capable of carrying out precise setting of images or imaging on the printing form in spite of the interference produced in many ways by the printing press.

In the method of setting images on printing forms according to the invention, imaging information is transferred by an imaging energy source to the printing form whereon an image is to be set. The method of the invention calls for determining a component of a relative movement between the imaging energy source and the printing form, and moving the imaging energy source in such a way that undesired components of the relative movement between the imaging energy source and the printing form are reduced.

In particular, the method of the invention calls for determining the difference between accelerations of the imaging energy source and the printing form, and moving the imaging energy source in such a way that the difference between the accelerations is reduced.

Other features which are considered as characteristic for the invention are set forth in the appended claims.

Although the invention is illustrated and described herein as embodied in an imaging device, an imaging module and a printing press having the imaging device and a method for setting images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a diagrammatic and schematic view of an imaging or image-setting device according to the invention.

DESCRIPTION OF THE PREFERRED EMBODIMENTS

Referring now to the single FIGURE of the drawing, there is shown therein an imaging or image-setting device including a laser 1, which serves as an imaging energy source. With the aid of the laser 1, an image is set on a printing form 2 which is mounted on a cylinder 3. The laser 1 is disposed on a linearly displaceable carriage 4 which has a plurality of piezoelectric elements 5. The piezoelectric elements 5 support the laser 1 with respect to the carriage 4. The cylinder 3 is rotatably mounted in two side walls 6. The laser 1 and/or the carriage 4 have a first acceleration sensor 7 for registering an acceleration A_Laser acting on the laser 1, and a second acceleration sensor 8 for registering an acceleration A_PZ acting on the cylinder 3 and, therefore, on the printing form 2. As an alternative thereto, the acceleration of the side wall 6 can also be determined and registered. The signal outputs from the first acceleration sensor 7 and the second acceleration sensor 8, respectively, are connected to an input of a subtracting device 9, which subtracts the acceleration A_Laser of the laser 1 from the acceleration A_PZ of the printing form 2 and outputs a differential signal A_PZ minus A_Laser at the output thereof. The output from the subtracting device 9 is connected to the input of a controller 10, which generates a signal U_Control and provides this signal at the output thereof. The target for the control, i.e., in other words, the set-point or nominal value of the control, is typically selected so that a differential acceleration of zero is to be achieved: A_PZ minus A_Laser=0. The output from the controller 10 is connected to the input of an amplifier 11. The amplifier 11 has a plurality of outputs, respectively, connected to each of the piezoelectric elements 5.

In an advantageous development of the invention, the piezoelectric elements 5 can be wired differentially: it is expedient to provide piezoelectric elements 5 in pairs in such a manner that a first piezoelectric element 5 on the first side of the laser 1 has assigned thereto a second piezoelectric element 5 on the second side of the laser 1. The stroke axes of the first and second piezoelectric element 5 are then mutually coordinated so that they are able to cooperate with the laser 1. In the FIGURE, two such pairs of piezoelectric elements 5 are shown. In addition, the stroke axes of the pairs are mutually alignable, in particular in parallel or orthogonal with one another. If a voltage $U_1$ is applied to a first piezoelectric element 5 in order to produce a first stroke $H_1$ of the piezoelectric element 5, a voltage $U_2$, typically at least approximately equal to $-U_1$, should then be applied to the opposite, second piezoelectric element 5 associated therewith, producing an opposing stroke $-H_1$. In this case, it is correspondingly true of each pair of piezoelectric elements 5. A voltage $U_3$ is applied to a third piezoelectric element 5, which is located on the same side as the first piezoelectric element 5, assuming an identical orientation of the first and third piezoelectric element 5 (parallel stroke), in order to produce a second stroke $H_2$ of the third piezoelectric element 5 with the same sign as that of the first stroke $H_1$. A voltage $U_4$, typically equal to at least approximately $-U_2$, should then be applied to the opposite, fourth piezoelectric element 5 assigned thereto, producing an opposing stroke $-H_2$.

In order to set an image on the printing form 2, the imaging information is transferred to the printing form 2 with the aid of a laser beam 12 produced by the laser 1. In order to achieve full-surface imaging, the laser beam 12 is scanned over the surface of the printing form 2. For this purpose, the cylinder 3 is set into rotation, and the carriage 4 is moved parallel to the longitudinal axis of the cylinder 3. In this regard, the rotational movement of the cylinder 3 and the translational movement of the carriage 4 are mutually coordinated so that the laser beam 12 is guided over the surface of the printing form 2 in accordance with a prescribable scheme. In synchronism therewith, the intensity of the laser beam 12 is modulated so that the desired information pattern is written into the printing form 2.

During the imaging operation, both the laser 1 and the cylinder 3 with the printing form 2 are subjected to interference, which leads to an undesired force action on the laser 1 or on the cylinder 3. This interference can be caused, for example, by mechanical oscillations of the system, which are excited when the system components are driven. Because of the different mechanical properties of the laser 1 and of the cylinder 3, the interference has a different effect upon the laser 1 and the cylinder 3, so that the laser 1 will generally execute a different movement than the cylinder 3 and, therefore, than the printing form 2 which is mounted on the cylinder 3.

The acceleration of the laser 1 and of the cylinder 3 and the printing form 2 therewith, respectively, resulting from the interference, can have a negative effect upon the precision of the imaging. In order to prevent this from happening, the piezoelectric elements 5 are driven in accordance with the invention in a manner that the relative acceleration between the laser 1 and the printing form 2, caused by the interference, becomes as small as possible. For this purpose, the signal A_Laser generated by the first acceleration sensor 7 belonging to the laser 1 is subtracted in the subtracting device 9 from the signal A_PZ from the second acceleration sensor 8 mounted on the cylinder 3. The differential signal (A_PZ-A_Laser or A_PZ minus A_Laser), which corresponds to the current relative acceleration between the laser 1 and the printing form 2, is fed into the controller 10 as a control deviation. The controller 10 attempts to outcontrol or stabilize the control deviation, i.e., the differential acceleration (A_PZ minus A_Laser), and for this purpose outputs the signal U_Control to the amplifier 11, which in turn drives the piezoelectric elements 5 accordingly. Because the dimensions of the piezoelectric elements 5 depend upon the respective voltage applied, the laser 1 fixed to the piezoelectric elements 5 can be moved by varying the voltages applied to the piezoelectric elements 5. In particular, the laser 1 can be accelerated by applying suitable voltages to the piezoelectric elements 5. In this regard, the voltages applied to the piezoelectric elements 5 can be controlled by the controller 10 so that the laser 1 is subjected to an acceleration which compensates as accurately as possible for the relative acceleration between the laser 1 and the printing form 2 caused by the interference.

If the cylinder 3 with the printing form 2 is accelerated by interference, the controller 10 then drives the piezoelectric elements 5 via the amplifier 11 in a manner that exactly the same acceleration acts upon the laser 1, so that the relative acceleration (A_PZ minus A_Laser) between the laser 1 and the cylinder 3, and therefore also between the laser 1 and the printing form 2, becomes zero, and the imaging operation is therefore not impaired. If, on the other hand, the interference acts upon the laser 1 so that the latter is accelerated, the controller 10 then causes the piezoelectric elements 5 to produce an opposite acceleration of the laser 1, so that the interference is compensated for.

The overall effect, therefore, is that the laser 1 and the printing form 2 are subjected to approximately the same acceleration at every instant of time, independent of interference, i.e., the resultant relative acceleration (A_PZ minus A_Laser) is virtually zero. This results in the relative movement between the laser 1 and the printing form 2, required for setting an image on the printing form, being not impaired by the interference, so that highly accurate imaging of the printing form 2 is possible. The source of the interference is unimportant in this regard. In particular, the laser 1 and the printing form 2 can carry out identical translational movements, i.e., also with a relative speed of zero, in the direction of the controlled degree of freedom.

The imaging device according to the invention can also be modified so that the relative speed between the laser 1 and the printing form 2 is determined by one or more suitable sensors, and the components of the relative speed which are not provided within the context of the imaging operation are compensated for by appropriately driving the piezoelectric elements 5. It is likewise also possible to determine, respectively, the relative position between the laser 1 and the printing form 2 by one or more sensors and, if the relative position does not correspond to the positioning desired during the imaging, to correct it.

For desired movements which are required within the context of the imaging process, the compensation mechanism can be disabled in a simple manner. For this purpose, a filter which allows no low-frequency signals to pass can be disposed, for example, between the subtracting device 9 and the controller 10. Because the interference usually has a considerably higher frequency than the desired movements, only the signals caused by the interference are supplied to the controller 10 and accordingly controlled out. The signals caused by the desired movements, on the other hand, are not taken into account. The limit between the interference and the desired movements is typically at a frequency of the order of magnitude of 1 hertz.

Instead of a single laser 1, the imaging device according to the invention can also have a plurality of lasers 1. In this case, the lasers 1 are either rigidly connected to one another or each laser 1 is supported on its own set of piezoelectric elements 5 and has its own first acceleration sensor 7.

In an imaging device according to the invention, control can include the differential acceleration, as described hereinabove with respect to the schematic view of FIG. 1, in one, two or three spatial directions. One possible embodiment of the imaging device according to the invention can have piezoelectric elements 5 for each controlled spatial direction, the respective elements 5 being able to produce a stroke in one spatial direction. Expressed in other words, the stroke vectors which describe the orientations of the strokes of the piezoelectric elements 5 can be linearly independent of one another. An alternative embodiment of the imaging device according to the invention includes piezoelectric elements 5, the stroke of which can be oriented. In other words, the piezoelectric elements 5 in such an embodiment are formed of a plurality of individual piezoelectric elements with linearly independent orientations, so that the individual strokes thereof can be superimposed for forming an overall stroke.

The imaging device according to the invention can selectively be constructed as a self-contained unit or integrated into a printing unit or into a printing press.

I claim:

1. A method of setting an image on a printing form, which comprises:
   transferring imaging information by an imaging energy source to a printing form whereon an image is to be set;
   determining an undesired component of a relative movement between the imaging energy source and the printing form, the undesired component of the relative movement resulting from interference acting on at least one of the imaging energy source and the printing form;
   moving, with an actuator device, the imaging energy source to reduce said undesired component of the relative movement between the imaging energy source and the printing form during an imaging operation, the actuator device being supported on a carriage of the imaging device;
   determining a difference between accelerations of the imaging energy source and the printing form; and
   moving the imaging energy source to reduce the difference between the accelerations.

2. An imaging device, comprising:
   an image setting device for setting an image on a printing form by at least one imaging energy source, the image setting device setting the image on the printing form by performing the method of claim 1, the image setting device including:
   a device for determining the undesired component of a relative movement between the imaging energy source and the printing form whereon an image is to be set, the undesired component of the relative movement; and
   an actuator device for moving the imaging energy source to reduce said undesired component of said relative movement between the imaging energy source and the printing form during an imaging operation, the actuator device being supported on a carriage of the imaging device.

3. The imaging device according to claim 1, further comprising a first sensor device for determining a component of a movement of the imaging energy source, and a second sensor device for determining a component of a movement of the printing form.

4. The imaging device according to claim 3, further comprising a linking device for determining said component of said relative movement between the imaging energy source and the printing form from said components of said movements respectively determined by said first and said second sensor devices.

5. The imaging device according to claim 1, further comprising a controller for generating a signal providing a basis for driving the actuator device, based upon the component of the relative movement between the imaging energy source and the printing form.

6. The imaging device according to claim 3, wherein said first and second sensor devices are acceleration sensors.

7. The imaging device according to claim 1, wherein said actuator device includes at least one piezoelectric element.

8. An imaging module, comprising:
- at least two imaging devices for setting an image on a printing form by at least one imaging energy source, each imaging device setting the image on the printing form by performing the method of claim 1, each imaging device including:
  - a device for determining the undesired component of a relative movement between the imaging energy source and the printing form whereon an image is to be set, the undesired component of the relative movement; and
  - an actuator device for moving the imaging energy source to reduce said undesired component of said relative movement between the imaging energy source and the printing form during an imaging operation, the actuator device being supported on a carriage of the imaging device.

9. A printing press, comprising:
- an imaging device for setting an image on a printing form by at least one imaging energy source, the imaging device setting the image on the printing form by performing the method of claim 1, the imaging device including:
  - a device for determining the undesired component of a relative movement between the imaging energy source and the printing form whereon an image is to be set, the undesired component of the relative movement; and
  - an actuator device for moving the imaging energy source to reduce said undesired component of said relative movement between the imaging energy source and the printing form during an imaging operation, the actuator device being supported on a carriage of the imaging device.

10. A printing press, comprising:
- an imaging module having at least two imaging devices for setting an image on a printing form by at least one imaging energy source, each imaging device setting the image on the printing form by performing the method of claim 1, each imaging device including:
  - a device for determining the undesired component of a relative movement between the imaging energy source and the printing form whereon an image is to be set, the undesired component of the relative movement; and
  - an actuator device for moving the imaging energy source to reduce said undesired component of said relative movement between the imaging energy source and the printing form during an imaging operation, the actuator device being supported on a carriage of the imaging device.

* * * * *